Dec. 28, 1965  W. E. CUTTILL  3,225,693

ROCKET VEHICLE ATTITUDE CONTROL

Filed Sept. 5, 1961

INVENTOR.
William Edward Cuttill
BY
ATTORNEY 3,225,693
ROCKET VEHICLE ATTITUDE CONTROL
William Edward Cuttill, Indianapolis, Ind., assignor to General Motors Corporation, Detroit, Mich., a corporation of Delaware
Filed Sept. 5, 1961, Ser. No. 135,838
5 Claims. (Cl. 102—50)

This invention relates to rocket vehicles and more particularly to a means for controlling the attitude thereof.

Rocket vehicles employ various types of attitude control systems such as jet vanes, controllable fins, and vectorable nozzles. The present invention is directed at providing a simpler attitude control than that afforded by conventional controls. The usual rocket vehicle is an elongated cylindrical structure which has a rocket engine at the rear end to provide thrust, centrally located fuel tanks and control systems and a payload or warhead at the nose end. The components of the vehicle are arranged so that the center of gravity falls on the vehicle axis. The rocket engine provides a thrust axis which coincides with the vehicle axis for stable flight and directional changes are accomplished by swiveling the exhaust nozzle or by moving vanes in the exhaust to angle the thrust axis with respect to the vehicle axis.

The present invention employs a different directional control concept and provides a means whereby the payload is moved laterally in the pitch and yaw planes to afford attitude control. When the payload is located at the nose of the rocket, it is connected to the rocket by a flexible heat shield and, as long as the vehicle remains in the atmosphere, the shifting of the payload will provide aerodynamic steering in the correct direction to supplement the torque steering afforded by the shifting of the center of gravity of the payload.

Figure 1:
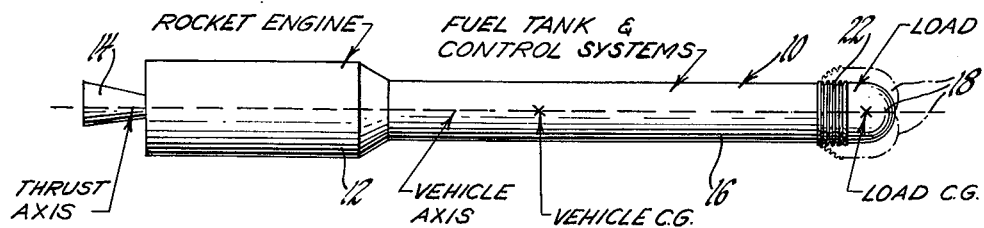
FIGURE 1 is a side elevation of a rocket vehicle employing the invention.
Figure 2:
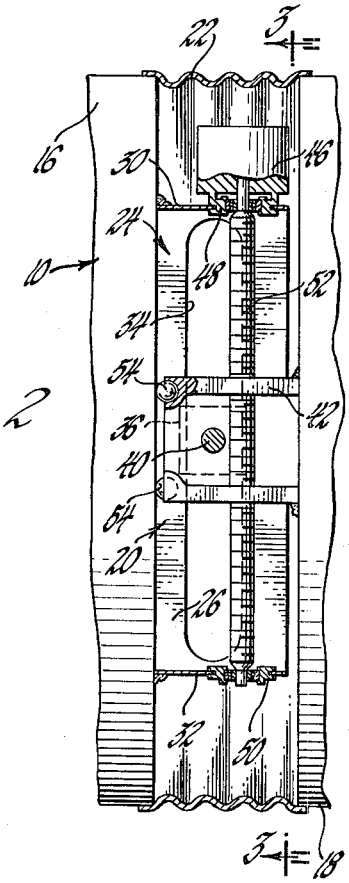
FIGURE 2 is an enlarged, partially broken away view of means connecting the payload to the remainder of the vehicle for movement in any lateral direction with respect to the vehicle axis.

Referring now to the drawings, the vehicle 10, which may be a guided missile, has the usual elongated cylindrical body 16 and includes a rocket engine 12 with a thrust nozzle 14. The fuel tank and control systems are housed in the body 16 and a payload 18 is movably supported on the front end of the body 16 by an actuator 20. All of the vehicle elements, other than the actuator 20, are conventional and need not be described in detail.

From FIGURE 1 it is seen that the engine thrust axis coincides with the vehicle axis and that the centers of gravity of the vehicle and payload fall thereon. The actuator 20 can move the payload laterally of the vehicle axis as indicated by the dot-dash positions. This lateral shifting of the payload center of gravity will cause the center of gravity of the entire vehicle to shift. This displacement of the vehicle center of gravity from the thrust axis causes a turning torque and the rocket will turn until the payload center of gravity is again aligned with the vehicle or thrust axis. A corrugated, flexible heat shield 22 connects the payload 18 to the casing 16 and it is seen that the movement of the payload laterally into the air stream will afford an aerodynamic steering assist in the proper direction. If the payload, for example, moves down in FIGURE 1, the vehicle center of gravity will move down from the thrust axis and the vehicle will turn in descending direction and, if the vehicle is in atmospheric flight, the lowered nose or payload will likewise steer the vehicle in descending direction.

Figure 3:
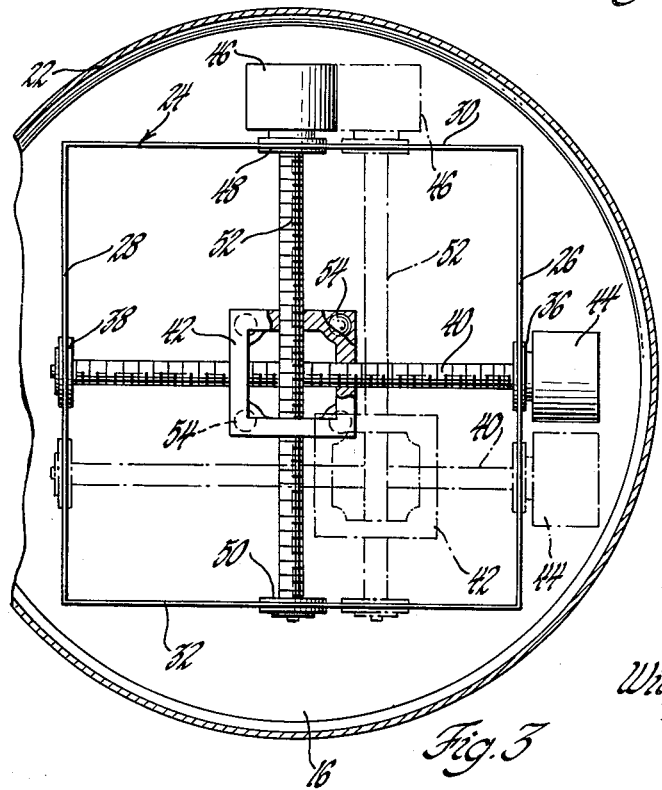
FIGURE 3 is a sectional view taken on the plane indicated by the line 3—3 of FIGURE 2.

Any suitable mechanism may be employed for the actuator 20 as long as it is capable of shifting the payload center of gravity in any direction laterally of the vehicle and thrust axis. The illustrated actuator 20 comprises a rectangular frame 24 secured to the casing 16 by walls 26, 28, 30 and 32 which are each slotted, as at 34. To afford control in the yaw direction, the slots of the walls 26 and 28 mount slideable guide shoes 36 and 38 which rotatably mount a screw shaft 40. The screw shaft 40 is threaded to a carrier 42 which is connected to the payload 18. A suitable actuating motor 44 is connected to the screw shaft 40 and energized in either direction to shift the carrier 42 to the right or left as seen in FIGURE 3.

Movement in the pitch direction is accomplished by a reversible actuator 46 which is carried by slidable guide shoes 48 and 50 mounted in slots 34 in the walls 30 and 32. The pitch screw shaft 52 is also threaded to the carrier 42 to raise and lower the same as seen in FIGURE 3 on energization of the actuator 46. Anti-friction rollers 54 are provided between the casing 16 and the payload carrier 42.

Conventional control systems may be used to power the actuators 44 and 46 in any direction both separately and simultaneously, and the payload 18 can thus have its center of gravity positioned at various radial distances from the vehicle axis and at any location circumferentially.

Rocket vehicles generally do not require rapid changes in direction, so a small shifting of the payload will usually provide adequate attitude control. It will be noted that the aerodynamic steering assist provided by the shifted payload will be lost when the vehicle leaves the atmosphere. Fuel dissipation by this time, however, will cause an increase in the ratio of the payload to the total vehicle weight which will increase the effectiveness of the payload shifts from a torque steering standpoint.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A rocket vehicle comprising an elongated cylindrical body housing a rocket engine and fuel supply, payload carried by said body, said body having an axis that coincides with the thrust axis of said engine, said body having a center of gravity lying on the thrust and body axis and said payload having a fixed center of gravity normally lying on thrust and body axis whereby the center of gravity of said vehicle is normally on the thrust and body axis, and an attitude control for said vehicle comprising motor driven support means for shifting said payload laterally of said body in any direction to thus shift the fixed center of gravity of said payload from the thrust and body axis so that the center of gravity of said vehicle is likewise displaced from the thrust and body axis whereby the resultant torque applied to said vehicle by said engine causes a change in direction.

2. A rocket vehicle as in claim 1 wherein said payload constitutes a moveable nose for said vehicle to provide aerodynamic steering when shifted by said motor driven support means.

3. A rocket vehicle as in claim 2 wherein said motor driven support means shifts said payload perpendicularly of said thrust and body axis.

4. A rocket vehicle comprising a main body housing a rocket engine, a payload having a fixed center of gravity carried by said body, said engine having a thrust axis that passes through the center of gravity of said body, and an attitude control for said vehicle comprising motored means for supporting said payload from said body for movement in any radial direction to thus move the fixed center of gravity of said payload in and out of said thrust axis whereby the center of gravity of said vehicle will also move in and out of said thrust axis and effect changes in attitude.

5. A rocket vehicle as in claim 4 wherein said payload constitutes a moveable aerodynamic steering nose for said vehicle.

References Cited by the Examiner
UNITED STATES PATENTS

| | | | |
|---|---|---|---|
| 1,250,178 | 12/1917 | Hover | 114—23 |
| 2,503,271 | 4/1950 | Hickman | 102—50 X |
| 2,774,305 | 12/1956 | Fitzgerald et al. | 102—50 X |
| 2,857,122 | 10/1958 | Maguire | 244—14 |

BENJAMIN A. BORCHELT, *Primary Examiner.*

SAMUEL FEINBERG, ARTHUR M. HORTON, *Examiners.*